Figure 1:
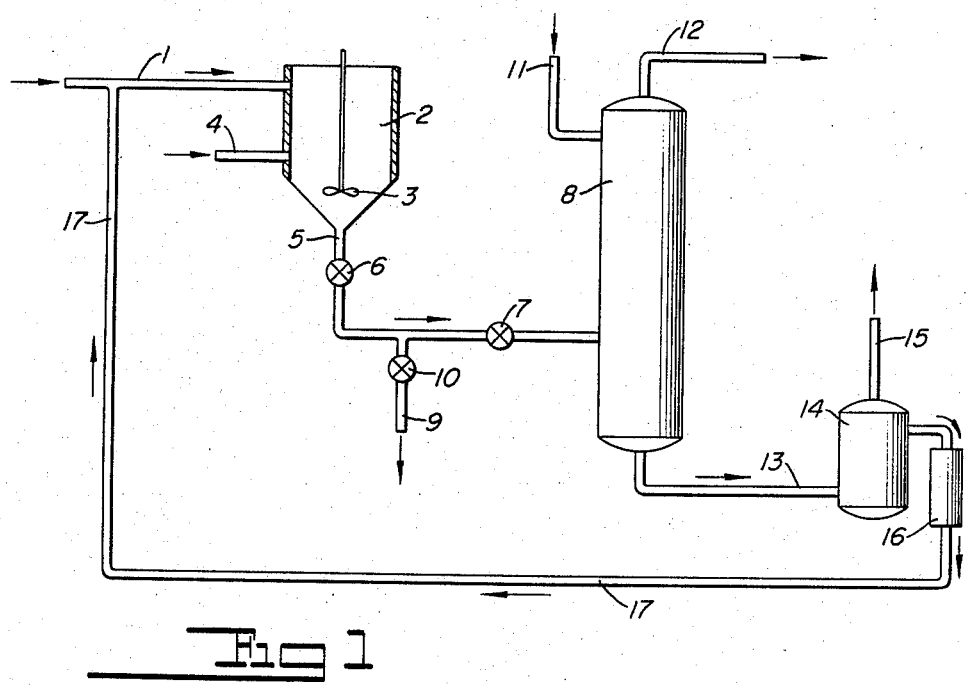

INVENTOR.
John B. Fishel
BY
ATTORNEYS.

United States Patent Office 2,885,453
Patented May 5, 1959

2,885,453

PROCESS FOR SEPARATING POLYCYCLIC AROMATIC COMPOUNDS FROM ORGANIC MIXTURES

John B. Fishel, Columbus, Ohio, assignor, by mesne assignments, to The Ohio Oil Company, Findlay, Ohio, a corporation of Ohio Application March 15, 1954, Serial No. 416,127

10 Claims. (Cl. 260—674)

This invention relates to a process for separating polycyclic aromatic compounds from mixtures with other hydrocarbons. More particularly, this invention provides a method for separating the polycyclic aromatics from the other organic compounds, wherein the mixture is contacted with maleic anhydride and maleic anhydride substitution products so as to form a liquid or solid complex of a polycyclic aromatic and the complexing agent.

In the past, the separation of hydrocarbon fractions has been carried out by using a large number of selective solvents; solid adsorbents; and complexing agents. Extractive distillation methods have also been utilized to effect this separation.

Various selective solvents such as sulfur dioxide, furfural diethylene glycol, oxydipropionitrile, and organic bases have been used. Selective adsorption techniques have centered largely around the use of materials such as silica gel.

Recently, efforts have been made to effect the separation of hydrocarbon fractions by using phthalic anhydride and its derivatives. While advantageous, the high cost of the complexing agents, the incompleteness of the separation, the high temperatures required to decompose the complex and the general criticality of temperatures throughout the entire separation process have made the use of phthalic anhydride and its derivatives, to separate polycyclic aromatics from other organic compounds, generally unsatisfactory. In addition, the equipment and installation required to effect separation using phthalic anhydride has been complicated and expensive, being dictated of necessity by the complicated processing steps required.

Therefore, it is an object of this invention to provide a process for the separation of polycyclic aromatic compounds from mixtures with other organic compounds.

Further, it is an object of this invention to provide such a process wherein the separation is accomplished by the formation of a complex comprising the polycyclic aromatic compound and maleic anhydride or maleic anhydride substitution products.

Still further, it is an object of this invention to provide a complexing agent that is lower in cost, will combine more completely with the polycyclic aromatic compound, and which may be decomposed and regenerated at low temperatures without the use of expensive and complex equipment.

Other objects and advantages of the present invention will be apparent in view of the following detailed disclosure and description thereof.

In the practice of this invention, a hydrocarbon mixture of polycyclic aromatic compounds with other organic compounds is contacted with the complexing agent, maleic anhydride and maleic anhydride substitution products. The mixture may be heated or agitated, if desired, to facilitate the formation of a complex. After the admixture of the complexing agent with the hydrocarbon mixture is complete, the complex formed separates as a distinct immiscible liquid or solid phase. The complex phase is then separated from the raffinate which is substantially free of polycyclic aromatic compounds.

The hydrocarbon mixture subjected to the process of this invention may be a fraction from a catalytic petroleum cracking process, such as "light catalytic cycle oil," or it may be crude petroleum. Moreover, the mixture may be derived from other sources, such as shale or the hydrogenation of coal.

The polycyclic aromatic compounds may include biphenyls and condensed polynuclear aromatic compounds, and substitution products and homologs thereof including mono- and poly-alkylated biphenyls and condensed polynuclear aromatic compounds. The condensed polynuclear compounds may be selected from the class consisting of naphthalene, acenaphthene, phenanthrene and anthracene.

By "other organic compounds" is meant those which do not form complexes with maleic anhydride or maleic anhydride substitution products. These other organic compounds have boiling points similar to the boiling points of the condensed polynuclear aromatic compounds. It has been determined in the practice of this invention that these include, as a broad class, all nonaromatic hydrocarbons found in mixtures as defined above. More specifically, other organic compounds include acyclic and alicyclic, saturated and unsaturated hydrocarbons.

The complex agent, maleic anhydride and maleic anhydride substitution products, may be any compound having the general formula

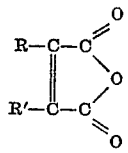

where R and R' are both selected from the group consisting of hydrogen, a halogen, an alkyl radical, an alkenyl radical, and an aryl radical. However, R and R' need not be the same.

The amount of heat required in the practice of this invention is that amount which will place the complexing agent in a liquid phase. Temperatures higher than the boiling point of the complexing agent may be used but there is an unnecessary loss of the complexing agent due to volatilization. The extreme temperature range of effective operation is thus between the melting point and the boiling point of the complexing agent used. However, the preferred temperature range is from 5 to 15° C. higher than the melting point of the complexing agent. For example, citraconic anhydride melts at 7–8° C. and thus could be used effectively as a complexing agent at or near room temperature. Maleic anhydride melts at 52.8° C. and thus can be used effectively only at an elevated temperature.

The complexing agent is not soluble in the hydrocarbon mixture and thus a certain amount of agitation which would insure thorough contact so as to facilitate the complex formation is helpful. By way of example, counter-current column extraction, mechanical mixing, or stirring have been found to be satisfactory in the practice of this invention.

When the mixing has been completed and the complex comprising the polycyclic aromatic compounds and the complexing agent is formed, the complex phase may be separated from the raffinate containing the other organic compounds by filtration, decantation, or other suitable means.

The complex phase is then decomposed to "break" the complex to the original components, that is, the complexing agent (or the corresponding acid) and the polycyclic aromatic compounds.

The decomposition may be accomplished by one of several methods. Water that has been heated to a temperature above the melting point of the particular anhydride used as the complexing agent may be used to effect decomposition. This method results in the formation of the corresponding acid of the anhydride used as complexing agent. The anhydride is regenerated from the acid by distillation, $H_2O$ being split out during the distillation so as to permit the re-use of substantially all of the original complexing agent.

As an alternative, an aqueous solution of maleic acid or maleic acid substitution products, which has been saturated at ordinary temperature, may be used. The aqueous solution is added to the complex phase at an elevated temperature. The complex is decomposed to the hydrolyzed acid of the complexing agent and the polycyclic aromatic compound. The hot saturated solution is separated from the aromatic fraction and allowed to cool. The excess maleic acid or the maleic acid substitution product present from the aqueous solution will precipitate out and may be removed by filtration or other suitable means. The cool solution is then reheated and used to decompose a further amount of complex. The anhydride is regenerated by distillation and heating from this precipitated maleic acid. It is desirable, though not required, that the acid used to make up the saturated aqueous solution correspond with the anhydride used as the complexing agent.

As an additional alternative method, decomposition may be accomplished by the use of a low boiling aliphatic hydrocarbon in which the complexing agent is substantially insoluble but which is a solvent at low temperatures for the polycyclic aromatic compounds. The complexing agent is recovered in the original anhydride form and may be re-used without further distillation. The condensed polynuclear aromatic is freed of solvent by distillation. Small amounts of complexing agent dissolved in the solvent may be removed by a dilute aqueous caustic wash. Examples of solvents which may be used are heptane, pentane, or petroleum naphthas boiling in the range of 80–100° C.

The relative ease with which the complex may be decomposed indicates that the practice of this invention results in the formation of a complex and does not result in the formation of compounds which are similar to complexes but are in reality true organic compounds, as, for example, adducts.

In the accompanying drawings, there are presented schematic diagrams of equipment of certain preferred procedures for effecting the process of the subject invention. For purposes of explanation, the process is illustrated by the separation of polycyclic aromatic compounds from a catalytically cracked petroleum fraction, using maleic anhydride as the complexing agent.

Referring now to Fig. 1: through pipe 1, molten maleic anhydride is introduced into a mixing vessel 2 fitted with a mixing means represented by propeller 3. In the mixing vessel 2, the complexing agent is contacted with charge oil which is introduced therein through line 4. The mixing vessel 2 is maintained at a temperature of about 60° C. at which temperature maleic anhydride is maintained in the liquid state while contacting the polycyclic aromatic compounds which are to be separated from the charge oil.

After thorough mixing in the vessel 2, the complex layer mixture of complexing agent and polycyclic aromatic is introduced through a pipe 5, past valve 6 and valve 7, into a countercurrent extraction column 8.

Valve 7 is then closed and the raffinate is drained off through pipe 9 regulated by valve 10, to a storage vessel not shown. In the countercurrent extraction column 8, hot water is added through pipe 11 and the decomposition of the complex takes place. The hot water may be introduced at a temperature up to 100° C. though a temperature in a range of from 60 to 90° C. is preferred.

The fraction of polycyclic aromatic compounds is led out through pipe 12 for further processing. The concentrated maleic acid solution which results from the decomposition of the complex is led off through pipe 13 into an evaporator and still 14. Heat is applied externally and water vapor is led off through pipe 15. A condenser 16 is affixed to the side of evaporator and still 14, the temperature of which is maintained low enough to condense maleic anhydride, but above its melting point, for example, 60 to 65° C. so that the maleic anhydride may be returned through pipe 17 to pipe 1. With reference to the removal of the complex and raffinate from the mixing vessel 2, the phases are separated by proper manipulation of valves 6, 7, and 10; the complex layer is heavier and is removed first. It is taken to the bottom of the extraction column 8 in the molten state. During this operation, valves 6 and 7 are open, and valve 10 is closed. The raffinate is removed from mixing tank 2 by closing valve 7 and opening valve 10.

Figure 2:
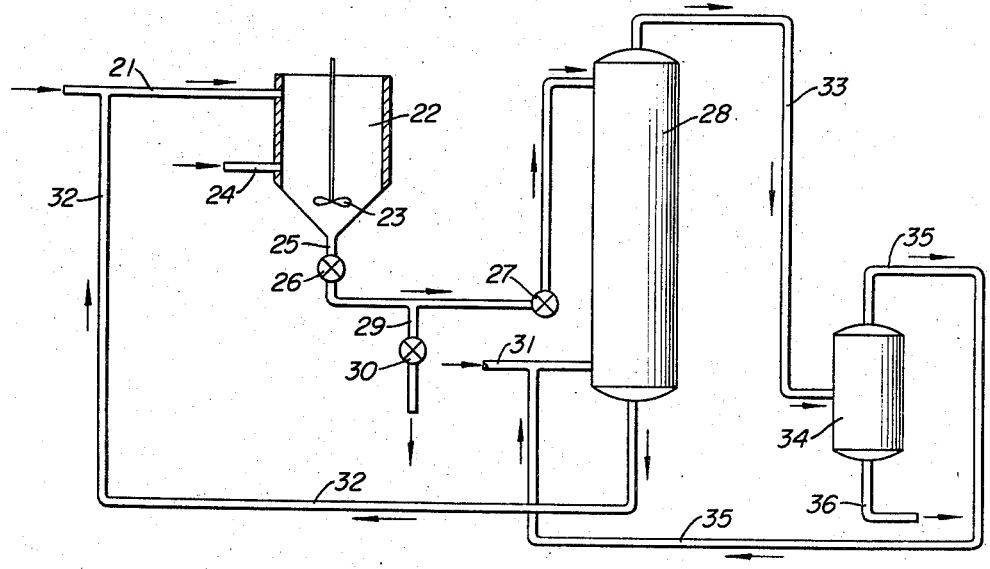

In Fig. 2, decomposition of the complex is accomplished using heptane. Molten maleic anhydride is introduced through pipe 21 into a mixing vessel 22 which is fitted with a stirring means represented by propeller 23. In the mixing vessel 22, the complexing agent is contacted with the charge oil which is introduced therein through a line 24. The mixing vessel 22 is maintained at a temperature of about 60° C. at which temperature maleic anhydride is maintained in the liquid state while contacting the polycyclic aromatic compounds which are to be separated from the charge oil.

After thorough mixing in the mixing vessel 22, the complex layer of complexing agent and polycyclic aromatic is introduced through a pipe 25, past valve 26 and valve 27, into an extraction column 28. Valve 27 is then closed and the raffinate is drained off through pipe 29 regulated by valve 30 to a storage vessel, not shown. In the extraction column 28, liquid heptane is added through pipe 31 and the decomposition of the complex takes place.

The temperature of the extraction column is maintained at a point above the melting point of maleic anhydride, for example, 60° C. The molten maleic anhydride is led out through pipe 32 and is returned to pipe 21 for re-use in the mixing vessel 22. The fraction containing the polycyclic aromatic compounds, and heptane, is led out through pipe 33 into a stripping still 34. Externally applied heat is used to separate the heptane from the polycyclic aromatic compounds, the heptane being removed through pipe 35 where it may be recycled to the bottom of the extraction column through pipe 31. The aromatic fraction is removed through pipe 36 where it may be water washed if desired to remove traces of maleic anhydride.

*Example I*

To a solution containing 5 grams of anthracene, 15 grams of kerosene, and 25 ml. of benzene were added 20 grams of maleic anhydride. The mixture was stirred at about 60° C. for 5 minutes. The mixture separated into two distinct phases. The lower or complex phase was separated in a preheated separatory funnel and allowed to flow into 200 ml. of cold water. Heating on a steam bath while stirring hydrolyzed the maleic anhydride and liberated the hydrocarbon which was filtered, using suction, dried on filter paper and weighed. The recovery of anthracene was 5 grams which is equal to a 100 per cent recovery.

*Example II*

This example was performed in the same manner as Example I except that 5 grams of phenanthrene were in the initial mixture and the addition of benzene to effect solution was not required. The recovery of phenanthrene was also 5 grams, indicating 100 percent recovery.

*Example III*

This example was performed in the same manner as

Example II except that 5 grams of 2,6-dimethyl naphthalene were used and the recovery was 2.5 grams, indicating a 50 percent recovery.

*Example IV*

This example was performed in the same manner as Example II except that 5 grams of 2,3-dimethyl naphthalene were used and the recovery was 2.5 grams, indicating a recovery of 50 percent.

*Example V*

This example was performed in the same manner as Example II except that 5.0 grams of acenaphthene were used and the recovery was 2.6 grams, indicating a recovery of 52 percent.

*Example VI*

This example was performed in the same manner as Example II except that 5 grams of naphthalene were used and 3.8 grams were recovered on the first treatment. To the raffinate was added 20 grams of maleic anhydride, which was again heated at about 60° C. for 5 minutes. This second treatment yielded 0.6 gram so that the total recovery in two stages was 88 percent.

*Example VII*

To 100 grams of light catalytic cycle oil containing 22–28% by weight of polycyclic aromatic compounds were added 100 grams of molten maleic anhydride at a temperature of 65° C. The mixture was stirred vigorously at a temperature of 65–72° C. for 10 minutes, and then allowed to settle for 5 minutes. The complex layer was separated from the raffinate and treated with 168 ml. of warm (60° C.) water. When hydrolysis was complete, the mixture was separated. The polycyclic fraction weighed 15 grams and had a refractive index $n_D^{25}$ of 1.5833. The raffinate was cooled and filtered to remove precipitated maleic anhydride. After filtration, the raffinate weighed 84.5 grams and had a refractive index $n_D^{25}$ of 1.4921. Calculated on the basis of refractive indices, the total recovery of pure polycyclic aromatic compounds was 12.9 grams, or a recovery of approximately 50% of all polycyclic aromatic compounds in the original 100 grams of light catalytic cycle oil.

*Example VIII*

To 20 grams of light catalytic cycle oil, which had been clay treated to remove phenols and sulfur compounds, containing 22–28% by weight of polycyclic aromatic compounds were added 20 grams of citraconic anhydride at room temperature. The mixture was well mixed and allowed to settle for 5 minutes. The complex layer was separated from the raffinate and heated on a steam bath with an equal volume of water. When hydrolysis was complete, the mixture was separated. The polycyclic fraction weighed 3 grams and had a refractive index $n_D^{25}$ of 1.5830. The total recovery of pure polycyclic aromatic compounds was 2.6 grams, or a recovery of approximately 50% of all polycyclic aromatic compounds in the original 20 grams of light catalytic cycle oil.

Thus, it will be seen that, in the practice of this invention, using maleic anhydride and maleic anhydride substitution products as complexing agents will result in a recovery of polycyclic aromatic compounds from mixtures with similar boiling hydrocarbons which is lower in cost, represents a high percentage of recovery, and may be performed at low temperatures without the use of expensive and complex equipment.

While several preferred embodiments of the particular invention have been described and shown, it will be obvious to those skilled in the art that various temperatures, proportions, and similar compounds could be used that would lie within the scope of this patent and, therefore, it is intended that this patent shall cover all such modifications, variations, and compounds as lie herein.

What is claimed is:

1. A process for the separation of polycyclic aromatic hydrocarbons from a mixture with other similar boiling point hydrocarbons selected from the group consisting of acyclic and alicyclic, saturated and unsaturated hydrocarbons comprising: (a) contacting said mixture with a complexing agent having the general formula

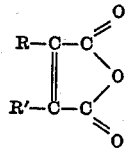

where R and R' are selected from the group consisting of hydrogen, a halogen, an alkyl radical, an alkenyl radical, and an aryl radical, at a temperature of at least the melting point of the complexing agent, to form a complex from which the polycyclic aromatic hydrocarbons can be regenerated by contact with hot liquid water; (b) before adduct formation occurs separating the complex thus formed as an immiscible phase from the raffinate containing the other organic compounds; (c) decomposing the complex by contacting the immiscible complex phase with a liquid selected from the group consisting of hot liquid water, a low boiling point liquid aliphatic hydrocarbon in which the complexing agent is substantially insoluble and which is a solvent at low temperatures for the polycyclic aromatic hydrocarbons, and a hot liquid saturated aqueous solution of a compound selected from the acids of said complexing agents; and (d) separating the polycyclic aromatic hydrocarbons as an immiscible phase disassociated from the complexing agent.

2. A process for the separation of polycyclic aromatic hydrocarbons from a mixture with other similar boiling point hydrocarbons selected from the group consisting of acyclic and alicyclic, saturated and unsaturated hydrocarbons comprising: (a) contacting said mixture with maleic anhydride at a temperature of at least the melting point of the maleic anhydride, to form a complex from which the polycyclic aromatic hydrocarbons can be regenerated by contact with hot water; (b) before adduct formation occurs separating the complex thus formed as an immiscible phase from the reffinate containing the other organic compounds; (c) decomposing the complex by contacting the immiscible complex phase with a liquid selected from the group consisting of hot liquid water, a low boiling point liquid aliphatic hydrocarbon in which the complexing agent is substantially insoluble and which is solvent at low temperatures for the polycyclic aromatic hydrocarbons, and a hot liquid saturated aqueous solution of maleic acid; and (d) separating the polycyclic aromatic hydrocarbons as an immiscible phase disassociated from the maleic anhydride.

3. A process for the separation of polycyclic aromatic hydrocarbons from a mixture with other similar boiling point hydrocarbons selected from the group consisting of acyclic and alicyclic, saturated and unsaturated hydrocarbons comprising: (a) contacting said mixture with maleic anhydride at a temperature of from about the melting point of the maleic anhydride to about 15° C. above the melting point of the maleic anhydride, to form a complex of the maleic anhydride with the polycyclic aromatic hydrocarbon; (b) before adduct formation occurs separating the complex thus formed as an immiscible phase from the reffinate containing the other organic compounds; (c) decomposing the complex by contacting the immiscible complex phase with a liquid selected from the group consisting of hot liquid water, a low boiling point liquid aliphatic hydrocarbon in which the maleic anhydride is substantially insoluble and which is a solvent at low temperatures for the polycyclic aromatic hydrocarbons, and a hot liquid saturated aqueous solution of maleic acid; and (d) separating the polycyclic aromatic hydrocarbons as an immiscible phase disassociated from the maleic anhydride.

4. The process according to claim 3 wherein the complex is decomposed by adding hot liquid water to the complex phase to form an aqueous phase and an immiscible hydrocarbon phase which consists of the polycyclic aromatic hydrocarbons disassociated from the maleic anhydride.

5. The process according to claim 3 wherein the complex is decomposed by the addition to the immiscible complex phase of a low boiling point liquid aliphatic hydrocarbon in which the maleic anhydride is substantially insoluble and which is a solvent at low temperatures for the polycyclic aromatic hydrocarbon.

6. The process according to claim 3 wherein the complex is decomposed by the addition to the immiscible complex phase of a hot liquid saturated aqueous solution of maleic acid.

7. A process for the separation of an extract rich in polycyclic aromatic hydrocarbons and a raffinate substantially free of polycyclic aromatic hydrocarbons from light catalytic cycle oil comprising: (a) contacting said mixture with maleic anhydride at a temperature of from at least the melting point to about 15° C. above the melting point of the maleic anhydride to form a complex of the maleic anhydride with the polycyclic aromatic hydrocarbons contained in the light catalytic cycle oil; (b) before adduct formation occurs separating the complex thus formed as an immiscible phase from the raffinate containing the other organic compounds; (c) decomposing the complex by contacting the immiscible complex phase with a liquid selected from the group consisting of hot liquid water, a low boiling point liquid aliphatic hydrocarbon in which the complexing agent is substantially isoluble and which is a solvent at low temperatures for the polycyclic aromatic hydrocarbons, and a hot liquid saturated aqueous solution of maleic acid; and (d) separating the polycyclic aromatic hydrocarbons as an immiscible phase disassociated from the maleic anhydride.

8. The process according to claim 7 wherein the complex is decomposed by adding hot liquid water to the immiscible complex phase to form an aqueous phase and an immiscible hydrocarbon phase which consists of the polycyclic aromatic hydrocarbons disassociated from the maleic anhydride.

9. A process according to claim 7 wherein the complex is decomposed by the addition to the immiscible complex phase of a low boiling point aliphatic hydrocarbon in which the maleic anhydride is substantially insoluble and which is a solvent at low temperatures for the polycyclic aromatic compound.

10. The process according to claim 7 wherein the complex is decomposed by the addition to the immiscible complex phase of a hot liquid saturated aqueous solution of maleic acid.

References Cited in the file of this patent

UNITED STATES PATENTS 2,347,228     Winans _____ Apr. 25, 1944
2,440,688     Insinger _____ May 4, 1948

OTHER REFERENCES

J. Am. Chem. Soc., vol. 60, pages 481–5 (1938). Article by Bachman et al.

Can. J. Research, vol. 26B, pages 719–27 (1948). Article by Jones et al.

J. Am. Chem. Soc., vol. 72, pages 1991–95 (1950). Article by Kloetze et al.

Andrews et al.: J. Am. Chem. Soc., vol. 75, pages 3776–9 (1953).